United States Patent
Li et al.

(10) Patent No.: US 9,862,896 B2
(45) Date of Patent: Jan. 9, 2018

(54) HYDROCARBON OIL HYDROTREATING METHOD

(71) Applicants: CHINA PETROLEUM & CHEMICAL CORPORATION, Beijing (CN); HUNAN CHANGLING PETROCHEMICAL SCIENCE AND TECHNOLOGY DEVELOPMENT CO., LTD, Yueyang, Hunan (CN)

(72) Inventors: Hua Li, Hunan (CN); Jianping Liu, Hunan (CN); Xichun She, Hunan (CN); Xiaojun He, Hunan (CN); Qinghua Li, Hunan (CN); Qingling Chen, Hunan (CN); Lei Jiang, Hunan (CN); Zhiyu Zeng, Hunan (CN); Chengli Liu, Hunan (CN); Qingpin Yang, Hunan (CN)

(73) Assignees: CHINA PETROLEUM & CHEMICAL CORPORATION, Beijing (CN); HUNAN CHANGLING PETROCHEMICAL SCIENCE AND TECHNOLOGY DEVELOPMENT CO., LTD, Yueyang, Hunan (CN)

( * ) Notice: Subject to any disclaimer, the term of this patent is extended or adjusted under 35 U.S.C. 154(b) by 207 days.

(21) Appl. No.: 14/430,499

(22) PCT Filed: Sep. 18, 2013

(86) PCT No.: PCT/CN2013/083791
§ 371 (c)(1),
(2) Date: Mar. 23, 2015

(87) PCT Pub. No.: WO2014/044196
PCT Pub. Date: Mar. 27, 2014

(65) Prior Publication Data
US 2016/0152902 A1    Jun. 2, 2016

(30) Foreign Application Priority Data

Sep. 21, 2012  (CN) .......................... 2012 1 0357165
Sep. 21, 2012  (CN) .......................... 2012 1 0357174
Sep. 21, 2012  (CN) .......................... 2012 1 0357221
Sep. 21, 2012  (CN) .......................... 2012 1 0360982

(51) Int. Cl.
| | |
|---|---|
| C10G 45/00 | (2006.01) |
| C10G 45/22 | (2006.01) |
| C10G 45/32 | (2006.01) |
| C10G 45/60 | (2006.01) |
| C10G 3/00  | (2006.01) |
| C10G 45/04 | (2006.01) |
| C10G 49/00 | (2006.01) |
| B01J 4/00  | (2006.01) |

(52) U.S. Cl.
CPC .............. *C10G 45/22* (2013.01); *B01J 4/004* (2013.01); *C10G 3/42* (2013.01); *C10G 3/44* (2013.01); *C10G 3/50* (2013.01); *C10G 45/00* (2013.01); *C10G 45/04* (2013.01); *C10G 45/60* (2013.01); *C10G 49/002* (2013.01); *C10G 2400/02* (2013.01); *C10G 2400/04* (2013.01); *C10G 2400/08* (2013.01); *Y02P 30/20* (2015.11)

(58) Field of Classification Search
CPC ......... C10G 45/00; C10G 45/22; C10G 45/32
See application file for complete search history.

(56) References Cited

U.S. PATENT DOCUMENTS

| | | | |
|---|---|---|---|
| 3,657,112 A | 4/1972 | Franz et al. | |
| 4,179,470 A | 12/1979 | Mischenko et al. | |
| 4,312,741 A | 1/1982 | Jacquin | |
| 4,756,821 A | 7/1988 | Giuliani et al. | |
| 6,428,686 B1 | 8/2002 | Ackerson et al. | |
| 6,517,706 B1 | 2/2003 | Pruden et al. | |
| 2004/0210097 A1* | 10/2004 | Chau ........................ | B01J 8/009 585/520 |
| 2005/0167354 A1 | 8/2005 | Caze et al. | |
| 2012/0149944 A1 | 6/2012 | Zmierczak et al. | |
| 2014/0100397 A1* | 4/2014 | Hwang ................ | B01D 53/228 585/250 |

FOREIGN PATENT DOCUMENTS

| | | |
|---|---|---|
| CN | 1131152 A | 9/1996 |
| CN | 1288777 A | 3/2001 |
| CN | 1418876 A | 5/2003 |

(Continued)

OTHER PUBLICATIONS

J. W. Veldsink, Selective Hydrogenation of Sunflower Seed Oil in a Three-Phase Catalytic Membrane Reactor, 78 J. Am. Oil Chem. Soc. 443-446 (2001).*

*Primary Examiner* — Randy Boyer
(74) *Attorney, Agent, or Firm* — Novick, Kim & Lee, PLLC; Allen Xue

(57) ABSTRACT

Provided is a hydrocarbon oil hydrotreating method, comprising the following steps: (1) injecting hydrogen into the hydrocarbon oil via an opening having a nanoscale average diameter, so as to obtain hydrocarbon oil containing hydrogen; and (2) under a liquid phase hydrotreating condition, feeding into a reactor the hydrocarbon oil containing hydrogen to contact a catalyst having a hydrogenation catalysis effect. The method of the present invention can quickly and efficiently disperse and dissolve the hydrogen into the hydrocarbon oil even without the aid of a diluent or circulating oil, so as to obtain stable hydrogen-containing hydrocarbon oil with a high hydrogen content, and obtain an (Continued)

hydrotreating effect equivalent to or even better than the existing hydrotreating methods.

19 Claims, 9 Drawing Sheets

FOREIGN PATENT DOCUMENTS

| | | | |
|---|---|---|---|
| CN | 1580197 | A | 2/2005 |
| CN | 101274922 | A | 10/2008 |
| CN | 101280217 | A | 10/2008 |
| CN | 101724443 | A | 6/2010 |
| CN | 101724444 | A | 6/2010 |
| CN | 101787305 | A | 7/2010 |
| CN | 201644076 | U | 11/2010 |
| CN | 101942319 | A | 1/2011 |
| CN | 101942326 | A | 1/2011 |
| CN | 101992048 | A | 3/2011 |
| CN | 101993719 | A | 3/2011 |
| CN | 101993721 | A | 3/2011 |
| CN | 102039104 | A | 5/2011 |
| CN | 102041035 | A | 5/2011 |
| CN | 102309932 | A | 1/2012 |
| CN | 102311790 | A | 1/2012 |
| CN | 102311791 | A | 1/2012 |
| JP | 2000-256677 | A | 9/2000 |
| JP | 2007209973 | A | 8/2007 |
| WO | 199859019 | A1 | 12/1998 |
| WO | 2004/103539 | A2 | 12/2004 |
| WO | 2006/039568 | A1 | 4/2006 |
| WO | 2006/055609 | A1 | 5/2006 |
| WO | 2006/102534 | A2 | 9/2006 |
| WO | 2009002960 | A1 | 12/2008 |
| WO | 2009002962 | A1 | 12/2008 |
| WO | 2010/042794 | A2 | 4/2010 |
| WO | 2011/068753 | A1 | 6/2011 |

\* cited by examiner

HYDROCARBON OIL HYDROTREATING METHOD

FIELD OF THE INVENTION

The present invention relates to a method for hydroprocessing hydrocarbon oil.

BACKGROUND OF THE INVENTION

In recent years, with the increasing scarcity of petroleum resources, the crude oil has become more and more heavy and inferior, and the contents of S, N, O, and metals in the middle distillate obtained through distilling crude oil have increased accordingly. However, the provisions on the contents of S, N, O, and metals in fuel oils specified in the laws and regulations in different countries of the world become harsh increasingly. Hydroprocessing is a common means for removing S, N, O, and metal impurities in hydrocarbon and improving the quality of middle distillate.

In the conventional hydroprocessing using trickle-bed reactor, a large quantity of circulating hydrogen gas and the corresponding circulating system are required to take away the reaction heat and inhibit carbon deposition and coke formation on the catalyst. Consequently, on one hand, the apparatus for hydrogenation reaction is bulky; on the other hand, the capital cost and energy consumption of the apparatus for hydrogenation reaction are increased.

In the hydroprocessing using a trickle-bed reactor, it is needed to transfer hydrogen gas from a vapor phase into a liquid phase, where the hydrogen gas is absorbed along with the reactants to the surface of a catalyst, and thereby the reaction happens under the action of catalyst activity center. Such a mass transfer process of hydrogen gas undoubtedly has adverse effects to the reaction rate of the hydroprocessing.

In view of the drawbacks in the conventional hydroprocessing using trickle-bed reactor, the researchers have developed a liquid phase hydrogenation process.

U.S. Pat. No. 6,428,686 discloses a hydroprocessing method, comprising mixing fresh raw oil with a diluent and a large quantity of hydrogen gas, separating excessive gas from the obtained mixture in a gas-liquid separation unit, and then feeding the mixture into a reactor so as to contact with a catalyst and perform hydrogenation reaction. The diluent is a substance in which the solubility of hydrogen gas is high (for example, circulating hydrocracked product or isomerized product), whereby to increase the amount of hydrogen gas carried in the hydrocarbon feed, as a result, the demand for the circulating hydrogen gas is eliminated.

The major procedures of the liquid-solid phase hydrogenation method for hydrocarbon oil disclosed in CN101280217A and CN101787305A comprise mixing fresh raw oil, circulating product, and hydrogen gas in an supersaturated amount, treating the obtained mixture by gas liquid separation in a gas liquid separation unit, and then feeding the mixture into a hydrogenation reactor to contact with a catalyst and perform reaction.

Although the demand for circulating hydrogen gas is eliminated in the liquid phase hydrogenation methods described above, all of these methods still have the following drawback: a diluent or circulating product is required to increase the amount of hydrogen gas carried in the feed, as a result, the throughput capacity of the hydrogenation apparatus for the fresh raw oil is decreased, which has an adverse effect on the production efficiency.

Therefore, there is an urgent demand for a method for hydroprocessing hydrocarbon oil in liquid phase without the aid of any diluent or circulate product, so as to simplify the process route, reduce capital cost and operation cost, and realize efficient and energy-saving industrial production.

SUMMARY OF THE INVENTION

The present application aims to overcome the drawbacks in the prior art, and provides a method for hydroprocessing hydrocarbon oil, according to the method, hydrogen gas can be dispersed highly and dissolved more quickly in hydrocarbon oil, even if neither diluent nor circulating product is employed.

The present invention provides a method for hydroprocessing hydrocarbon oil, comprising the following steps, (1) injecting hydrogen gas into hydrocarbon oil through pores with an average pore diameter in nanometer size, to obtain a hydrogen-containing hydrocarbon oil;

(2) feeding the hydrogen-containing hydrocarbon oil into a reactor, to contact with a catalyst having a hydrogenation catalytic action under a liquid-phase hyroprocessing condition.

In a preferred embodiment of the present invention, the pores have an average pore diameter in a range of 1 nm to 1,000 nm. More preferably, percentage of quantity of pores with a pore diameter in a range of 50 nm to 500 nm to total quantity of the pores is 95% or higher.

In a preferred embodiment of the present invention, the hydrogen gas is injected into the hydrocarbon oil in a flowing state, the hydrogen gas is injected at a rate of $v_1$ by $g \cdot h^{-1} \cdot m^{-2}$, and the hydrocarbon oil has a flow rate of $v_2$ by $kg \cdot h^{-1} \cdot m^{-2}$, ratio of $v_1/v_2$ is in a range of 0.000625 to 0.09, so as to achieve a further improved effect of the dispersing and dissolving hydrogen gas.

In an embodiment of the present invention, hydrogen gas is injected into the hydrocarbon oil by means of a mixing device, to obtain the hydrogen-containing hydrocarbon oil, the mixing device comprises at least one liquid passage for accommodating the hydrocarbon oil and at least one gas passage for accommodating the hydrogen gas, the liquid passage is adjacent to the gas passage through a component, at least part of the component is a porous area having the pores with an average pore diameter in nanometer size, the hydrogen gas is injected into the hydrocarbon oil through the pores with an average pore diameter in nanometer size. Preferably, the porous area has a porosity in a range of 5-28%.

In a preferred embodiment of the present invention, the reactor is a tubular reactor, ratio of length to inner diameter of the tubular reactor is preferably in a range of 5-50:1, and the tubular reactor preferably has an inner diameter in a range of 20 mm to 1,000 mm. A hydrogenation effect comparable to or better than that achieved by the prior hydroprocessing can be achieved by injecting the hydrogen gas into the hydrocarbon oil in the mixing device, and feeding the obtained hydrogen-containing hydrocarbon oil into the tubular reactor to contact with a catalyst having a hydrogenation catalytic action under a liquid-phase hydroprocessing with a lower hydrogen gas consumption, even if neither diluent nor circulating product is employed.

In a preferred embodiment of the present invention, the hydroprocessing is one or more selected from the group consisting of hydrodeolefin, hydrodesulfurization, hydrodenitrogenation, hydrodeoxygenation, and hydrodemetalization. The hydrocarbon oil is preferably one or more selected from the group consisting of gasoline, reformate, aviation fuel, and diesel oil. In the preferred embodiment, the hydrogen gas is preferably injected in an amount for 0.1 to 4 times of the saturated solubility of the hydrogen gas in the hydrocarbon oil, the saturated solubility is a saturated solubility measured under the liquid-phase hydroprocessing condition.

BRIEF DESCRIPTION OF THE DRAWINGS

The accompanying drawings are provided here to facilitate further understanding on the present invention, and constitute a part of the description, which are used in conjunction with the following embodiments to explain the present invention, but shall not be comprehended as constituting any limitation to the present invention. Among the drawings.

DETAILED DESCRIPTION OF THE EMBODIMENTS

Figure 1:
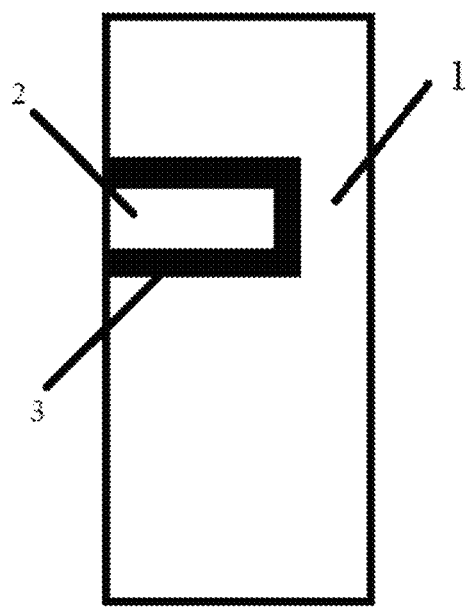
FIG. 1 is a schematic structural diagram of an embodiment of the mixing device used in the method for hydroprocessing hydrocarbon oil according to the present invention.

The present invention provides a method for hydroprocessing hydrocarbon oil, comprising the following steps:

(1) injecting hydrogen gas into hydrocarbon oil through pores with an average pore diameter in nanometer size, to obtain a hydrogen-containing hydrocarbon oil;

(2) feeding the hydrogen-containing hydrocarbon oil into a reactor, to contact with a catalyst having a hydrogenation catalytic action under a liquid-phase hydroprocessing condition.

In the present invention, the pores with an average pore diameter of the pores in nanometer size may have an average pore diameter in a range of 1 nm to 1,000 nm, preferably in a range of 30 nm to 1,000 nm, more preferably in a range of 30 nm to 800 nm, even more preferably in a range of 50 nm to 500 nm. The average pore diameter is measured with a scanning electron microscopy.

For the purpose of further improving the effect of dispersing and mixing a gas in a liquid and thereby enable the gas to be dispersed more quickly and more homogeneously in the liquid, percentage of quantity of pores with a pore diameter in a range of 50 nm to 500 nm to total quantity of the pores may be 95% or higher, such as, in a range of 96-98%.

The hydrogen gas may be injected into the hydrocarbon oil in a static state or in a flowing state. Preferably, the hydrogen gas is injected into the hydrocarbon oil in a flowing state, so that the hydrogen gas can be injected into the hydrocarbon oil during the period of transporting the hydrocarbon oil, and thereby the production efficiency can be further improved. In the case that the hydrogen gas is injected into the hydrocarbon oil in a flowing state, the hydrogen gas may be injected into the hydrocarbon oil at a rate of $v_1$ by $g \cdot h^{-1} \cdot m^{-2}$ (the total amount of the hydrogen gas passing through the pores in per unit area within per unit time), the hydrocarbon oil may have a flow rate of $v_2$ by $kg \cdot h^{-1} \cdot m^{-2}$ (the mass of hydrocarbon oil passing through per unit area of cross section within per unit time), ratio of $v_1/v_2$ may be in a range of 0.000625 to 0.09, so as to achieve a further improved effect of dispersing and dissolving hydrogen gas. Preferably, the ratio of $v_1/v_2$ is in a range of 0.005 to 0.06, so as to achieve better effect of dispersing and dissolving hydrogen gas, and higher production efficiency.

The hydrogen gas may be injected into the hydrocarbon oil at a rate in a range of 0.0001 $kg \cdot h^{-1} \cdot m^{-2}$ to 2,000 $kg \cdot h^{-1} \cdot m^{-2}$.

The hydrogen gas may be injected into the hydrocarbon oil through pores with an average pore diameter in nanometer size by a variety of methods.

In a preferred embodiment of the present invention, the hydrogen gas is injected into the hydrocarbon oil by means of a mixing device, the mixing device comprises at least one liquid passage for accommodating the hydrocarbon oil and at least one gas passage for accommodating the hydrogen gas, the liquid passage is adjacent to the gas passage through a component, at least part of the component is a porous area having the pores with an average pore diameter in nanometer size, the hydrogen gas is injected into the hydrocarbon oil through the pores with an average pore diameter in nanometer size.

In the present invention, the term "liquid passage" refers to a space that can accommodate the hydrocarbon oil; the term "gas passage" refers to a space that can accommodate the hydrogen gas.

Figure 2:
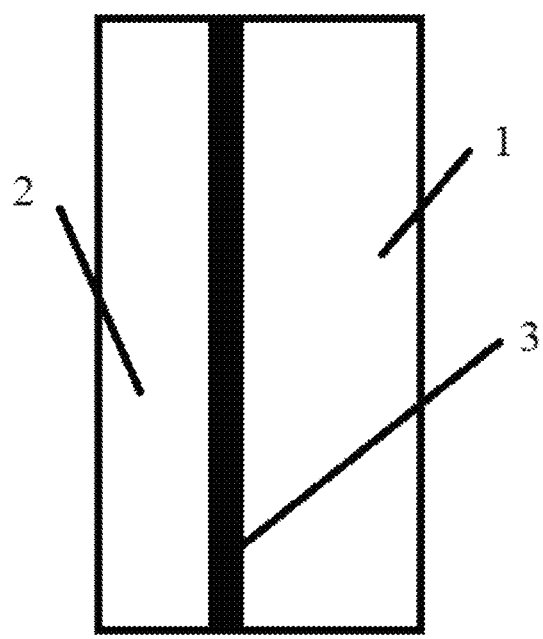
FIG. 2 is a schematic structural diagram of another embodiment of the mixing device used in the method for hydroprocessing hydrocarbon oil according to the present invention.
Figure 3:
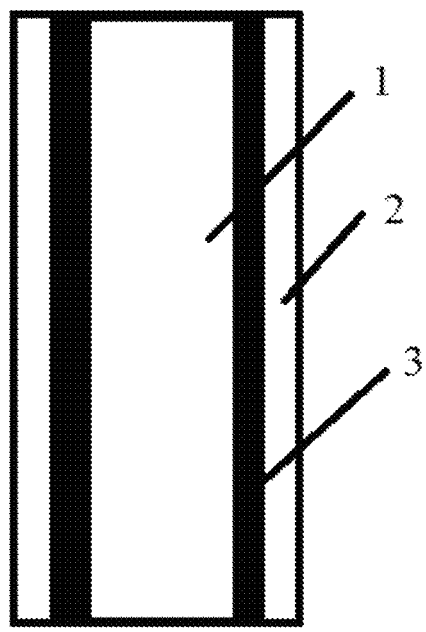
FIG. 3 is a schematic structural diagram of yet another embodiment of the mixing device used in the method for hydroprocessing hydrocarbon oil according to the present invention.

There is no particular restriction on the positional relationship between the liquid passage and the gas passage, as long as the liquid passage is adjacent to the gas passage through the component. In an embodiment, as shown in FIG. 1, the gas passage 2 is disposed in the liquid passage 1, and the inner wall of the component 3 forms the gas passage 2. In another embodiment, as shown in FIG. 2, the gas passage 2 is disposed at a side of the liquid passage 1, the liquid passage 1 and the gas passage 2 are separated by the component 3. In a preferred embodiment, as shown in FIG. 3, the gas passage 2 surrounds outside of the liquid passage 1, the gas passage 2 and the liquid passage 1 are separated by the component 3.

At least part of the component is a porous area, which extends in the direction of the length of the component. Preferably, the porous area covers the entire component (i.e., the liquid passage is adjacent to the gas passage through the component having pores with an average pore diameter in nanometer size, and the hydrogen gas is injected through the pores with an average pore diameter in nanometer size into the hydrocarbon oil). The porous area has the pores with an average pore diameter in nanometer size, so as to inject the hydrogen gas through the pores with an average pore diameter in nanometer size into the hydrocarbon oil. The porous area preferably has a porosity in a range of 5-28%, so that enough hydrogen gas can be dispersed and dissolved in the hydrocarbon oil better. The porous area more preferably has a porosity in a range of 10-25%. The porosity refers to the percentage of the total volume of the pores in the porous area to the total volume of the porous area, and is measured by a nitrogen adsorption method.

The component may be any component that enables the hydrogen gas accommodated in the gas passage to pass through the pores with an average pore diameter in nanometer size and enter into the hydrocarbon oil accommodated in the liquid passage. In an embodiment, the component is made of a porous material having pores with an average pore diameter in nanometer size. In another embodiment, the component comprises a substrate and a porous membrane attached to the substrate, the substrate has through-holes, and the porous membrane may be disposed on surface of the substrate that contacts with the hydrocarbon oil accommodated in the liquid passage or on surface of the substrate that contacts with the hydrogen gas accommodated in the gas passage. Preferably, the porous membrane is disposed on surface of the substrate that contacts with the hydrocarbon oil accommodated in the liquid passage. The porous membrane has pores with an average pore diameter in nanometer size. There is no particular restriction on the average pore diameter of the through-holes in the substrate, as long as the gas can pass through the through-holes. Preferably, the through-holes in the substrate has an average pore diameter in micrometer size (i.e., in a range of 1 µm to 1,000 µm) or in nanometer size (i.e., in a range of 1 nm to 1,000 nm).

The component is preferably a tube, more preferably a membrane tube (i.e., the porous tube with through-holes serves as a substrate, and the porous membrane is attached to the inner wall and/or outer wall of the porous tube). The membrane tube can be any common inorganic membrane tube (for example, inorganic ceramic membrane tube) or organic membrane tube.

In practice, in the case that the component is a tube or membrane tube, the tube or membrane tube may be used in combination with a housing. That is, the tube or membrane tube is disposed in a housing, and there is a space between the outer wall of the tube or membrane tube and the inner wall of the housing. The space enclosed by the inner wall of the tube or membrane tube is used as the liquid passage for accommodating the hydrocarbon oil, while the space formed between the outer wall of the tube or membrane tube and the inner wall of the housing is used as the gas passage for accommodating the hydrogen gas; alternatively, the space enclosed by the inner wall of the tube or membrane tube is used as the gas passage for accommodating the hydrogen gas, while the space formed between the outer wall of the tube or membrane tube and the inner wall of the housing is used as the liquid passage for accommodating the hydrocarbon oil. Preferably, the space enclosed by the inner wall of the tube or membrane tube is used as the liquid passage for accommodating the hydrocarbon oil, while the space formed between the outer wall of the tube or membrane tube and the inner wall of the housing is used as the gas passage for accommodating the hydrogen gas.

Figure 4:
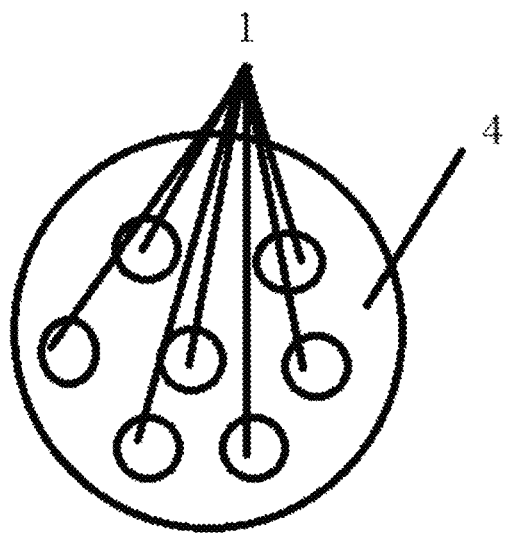
FIG. 4 is a cross sectional view of a preferred embodiment of the component with a porous area in the mixing device used in the method for hydroprocessing hydrocarbon oil according to the present invention.

In the case that the component is a tube or membrane tube, the tube or membrane tube may have one or more liquid passages. For the purpose of further improving the efficiency of the method according to the present invention (i.e., more hydrogen gas can be dispersed and dissolved in the hydrocarbon oil in the same time), as shown in FIG. 4 (a cross section view of the tube), the inner wall of the tube 4 forms a plurality of liquid passages 1 parallel to each other (for example, 4-20 liquid passages). In the case that inner wall of the tube 4 forms a plurality of liquid passages, preferably the liquid passages are distributed uniformly.

According to the present invention, the housing may be any component that has a hollow structure and at least one opening, the opening is for connecting with a source of hydrogen gas or a hydrocarbon oil tank, to direct the hydrogen gas or the hydrocarbon oil into the space between the inner wall of the housing and the outer wall of the tube (i.e., the gas passage or liquid passage).

The component may be prepared by a conventional method or may be available commercially, and it will not be further described in detailed herein.

The method according to the present invention, the injection amount of the hydrogen gas can be determined appropriately according to the saturated solubility of hydrogen gas in the hydrocarbon oil. The method according to the present invention, the hydrogen gas may be injected into the hydrocarbon oil in an amount for 0.01 to 4 times, preferably 0.5 to 3 times of the saturated solubility of the hydrogen gas in the hydrocarbon oil. The saturated solubility refers to the saturated amount by gram of hydrogen gas dissolved in 100 g hydrocarbon oil under the liquid-phase hydroprocessing condition.

The hydrogen gas may be injected into the hydrocarbon oil in one time or in several times. As an example for injecting the hydrogen gas in several times, in the case that the hydrogenation reaction is performed in several consecutive stages and the product obtained in the preceding stage is used as the feed of the subsequent hydrogenation stage, the hydrogen gas may be respectively injected into the feed for each stage before hydrogenation reaction. The method according to the present invention, the hydrogen gas can be dispersed highly and dissolved more quickly in the hydrocarbon oil. Therefore, the method according to the present invention, the amount of hydrogen gas carried in the hydrocarbon oil is enough to meet the requirement of the hydroprocessing, even if the hydrogen gas is not injected in a large amount into the hydrocarbon oil. According to the present invention, the total amount of the hydrogen gas injected into the hydrocarbon oil may be 0.1 to 4 times, preferably 0.2 to 2 times, more preferably 0.5 to 1.5 times of the chemical hydrogen consumption of the hydrocarbon oil.

The saturated solubility of hydrogen gas in the hydrocarbon oil and the chemical hydrogen consumption of the hydrocarbon oil can be determined by a common method in the prior art, and thus, it will not be described in detailed herein.

The method according to the present invention, there is no particular restriction on the temperature and pressure of the hydrocarbon oil when injecting the hydrogen gas, which can be an ordinary choice in the art. Preferably, the temperature and pressure of the hydrocarbon oil may have a temperature and a pressure at which the hydrocarbon oil contacts with a catalyst having a catalytic hydrogenation action.

The method according to the present invention, the reactor is preferably a tubular reactor. The tubular reactor refers to a reactor with a high ratio of length to inner diameter, for example, the tubular reactor may have a ratio of length to inner diameter in a range of 5-50:1. According to the present invention, the inner diameter of the tubular reactor may be an ordinary choice, such as 20 mm to 1,000 mm. Compared with a tank type reactor, a tubular reactor is helpful for reducing the reactor size, and enables the mixing device to be arranged directly on the inlet line of the reactor to mix hydrogen during the period of transporting the hydrocarbon oil, so as to further improve the production efficiency.

The method according to the present invention, the hydrogenation reaction may be carried out in a plurality of reactors connected in series connection or in parallel connection, or combination thereof. The serial connection means that the hydrocarbon material output from a preceding reactor is used as the feed of the subsequent reactor. The parallel connection means that there is no material exchange among the reactors. In the case that the reactors are connected in series, preferably the hydrogen gas is injected into the hydrocarbon oil stream before each reactor in an amount depending on the chemical hydrogen consumption of the hydrocarbon oil stream feeding into the reactor.

The method according to the present invention, in the case that the hydrogen gas is injected into the hydrocarbon oil by means of the mixing device described above to obtain hydrogen-containing hydrocarbon oil and feed the hydrogen-containing hydrocarbon oil into the reactor, an outlet O for outputting the hydrogen-containing hydrocarbon oil on the mixing device may have a inner diameter of $r_1$, an inlet I for inputting the hydrogen-containing hydrocarbon oil on the reactor may have a inner diameter of $r_2$, ratio of $r_1/r_2$ may be in a range of 0.6 to 1. A tube connecting the outlet O to the inlet I may have an inner diameter of $r_3$, ratio of $r_1/r_3$ may be in a range of 0.85 to 1.5. As a result, the hydrogen-containing hydrocarbon oil is more stable in the transportation process, and thereby a better hydrogenation effect can be obtained.

The method according to the present invention, the hydrocarbon oil may be any common hydrocarbon oil need to be hydroprocessed in the art. The example of the hydrocarbon oil may be but not limit to one or more selected from the group consisting of gasoline, reformate, aviation fuel, and diesel oil.

The method according to the present invention, the hydroprocessing may be any conventional hydrogenation process in the art; in particular, the hydroprocessing is preferably hydrorefining, which may be but is not limit to one or more selected from the group consisting of hydrodeolefin, hydrodesulfurization, hydrodenitrogenation, hydrodeoxygenation, and hydrodemetalization.

The method according to the present invention, the catalyst having a catalytic hydrogenation action may be any commonly used catalyst having a hydrogenation catalytic action in the art, and the catalyst can be selected appropriately according to the type and properties of the hydrocarbon oil to be hydroprocessed on the basis of common knowledge in the art; and thus, it will not be described in detailed herein.

The method according to the present invention, the catalyst having a catalytic hydrogenation action may be used in a common amount. Specifically, the liquid-volume hourly space velocity of the hydrocarbon oil may be in a range of $0.5\ h^{-1}$ to $20\ h^{-1}$ in the case that the hydrogenation reaction is carried out in a fixed-bed reactor. The method according to the present invention, the hydrogen gas can be dispersed highly and dissolved more quickly in the hydrocarbon oil, and the obtained hydrogen-containing hydrocarbon oil has high stability and the hydrogen gas will not escape from the hydrocarbon oil easily. Therefore, in the method according to the present invention, the liquid-volume hourly space velocity of the hydrocarbon oil may even be in a range of $6\ h^{-1}$ to $20\ h^{-1}$, as a result, not only higher production efficiency can be obtained, but also an excellent hydrogenation effect can still be obtained.

The method according to the present invention, the liquid-phase hydroprocessing condition may be an ordinary choice in the art. Usually, the liquid-phase hydrogenation condition comprises: the temperature may be in a range of 120° C. to 500° C., preferably in a range of 150° C. to 450° C.; the pressure by gage pressure may be in a range of 1 MPa to 20 MPa, preferably in a range of 2 MPa to 15 MPa. In addition, a commonly used method in the art may be utilized to enable the liquid-state hydrocarbon oil in the hydrogenation reactor to be a continuous phase; and thus, it will not be described in detailed herein.

Figure 5:
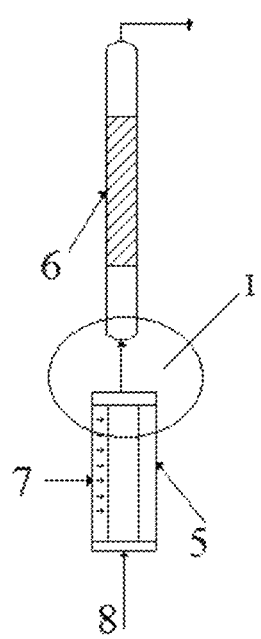
FIG. 5 shows a preferred embodiment of the method for hydroprocessing hydrocarbon oil according to the present invention.
Figure 6:
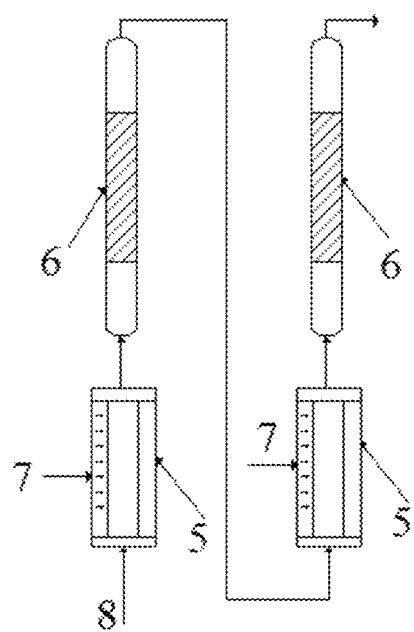
FIG. 6 shows an embodiment of the serial connection of a plurality of hydrogenation reactors in the method for hydroprocessing hydrocarbon oil according to the present invention.
Figure 7:
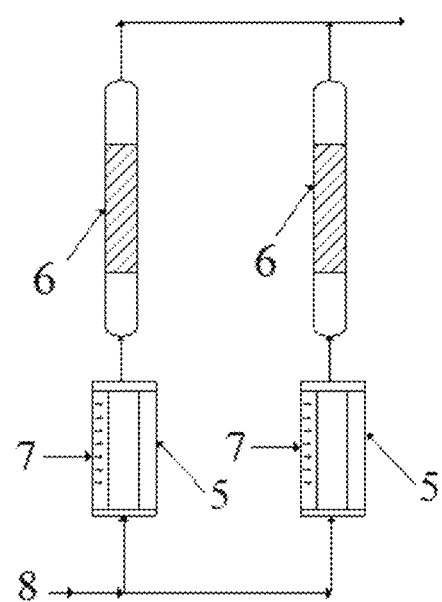
FIG. 7 shows an embodiment of the parallel connection of a plurality of hydrogenation reactors in the method for hydroprocessing hydrocarbon oil according to the present invention.

FIG. 5 shows a preferred embodiment of the method according to the present invention. In the preferred embodiment, hydrogen gas 7 is injected and dissolved in hydrocarbon oil 8 in mixing device 5, and the resulted hydrogen-containing hydrocarbon oil enters into hydrogenation reactor 6 (preferably a tubular reactor) so as to contact with a catalyst having a hydrogenation catalytic action and to perform hydrogenation reaction. According to the embodiment, a plurality of hydrogenation reactors can be arranged, and the hydrogenation reactors may be connected in series or in parallel. In the case that the hydrogenation reactors are connected in series, in the flowing direction of the hydrocarbon oil, the mixing device may be arranged at the inlet side of the first hydrogenation reactor; alternatively, as shown in FIG. 6, mixing device 5 may be arranged at the inlet side of each hydrogenation reactor 6. In the case that the hydrogenation reactors are connected in parallel, only one mixing device may be arranged, to mix the hydrocarbon oil with hydrogen gas, and then, feed the obtained mixture into the hydrogenation reactors connected in parallel respectively; alternatively, as shown in FIG. 7, mixing device 5 may be arranged at the inlet side of each hydrogenation reactor 6.

Figure 8:
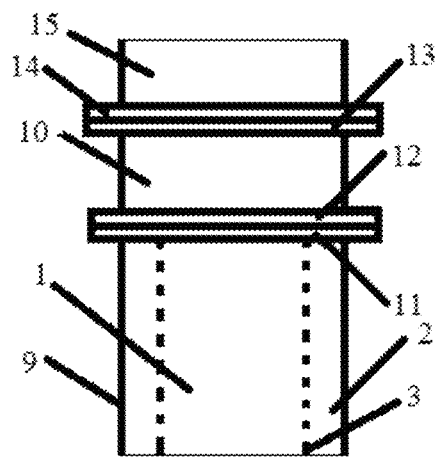
FIG. 8 shows the part I in FIG. 5.

FIG. 8 is shows the part I in FIG. 5, illustrating the connectional relationship between the mixing device 5 and the hydrogenation reactor 6. As shown in FIG. 8, the mixing device 5 comprises gas passage 2 and liquid passage 1, and the gas passage 2 and the liquid passage 1 are adjacent each other through component 3, wherein, the component 3 has a porous area distributed with pores with an average pore diameter in nanometer size along its entire length, and the inner wall of the component 3 forms the liquid passage 1, while the outer wall of the component 3 and the inner wall of the housing 9 form the gas passage 2, the two ends of the gas passage 2 are sealed, and the housing 9 has an opening (not shown) for connecting with a source of hydrogen gas. The mixing device 5 is connected with inlet line 10 of the hydrogenation reactor 6. During operation, the hydrocarbon oil is fed into the hydrogenation reactor 6 through the liquid passage 1; as the hydrocarbon oil flows through the liquid passage 1, the hydrogen gas in the gas passage 2 is injected through the component 3 into the hydrocarbon oil and thereby is dissolved in the hydrocarbon oil; then, the resulted hydrogen-containing hydrocarbon oil enters into the hydrogenation reactor 6, so as to perform a hydrogenation reaction in presence of a catalyst having a catalytic hydrogenation action.

The mixing device 5 may be connected to the inlet line 10 in a variety of methods, for example, a flange may be arranged on each end of the mixing device 5 (one of the flange 11 is shown in FIG. 8), and each flange is tightly connected with corresponding flange on the inlet line 10 (as shown in FIG. 8, the flange 11 on one end of the mixing device is tightly connected with the flange 12 on the inlet line 10); the other end of the inlet line 10 is connected via flange 13 to flange 14 at the inlet side 15 of the hydrogenation reactor 6.

Compared with the prior method for hydroprocessing hydrocarbon oil in liquid phase, the method according to the present invention has advantages as indicated below.

(1) The hydrocarbon oil can carry a large amount of hydrogen gas even without the aid of a diluent or circulating product, and thereby the method according to the present invention can achieve higher production efficiency.

(2) Hydrogen gas can be dispersed and dissolved in hydrocarbon oil quickly and efficiently, and the mixture of hydrocarbon oil and hydrogen gas can be directly fed into a hydrogenation reactor for hydrogenation reaction without gas liquid separation.

(3) The hydrogen-containing hydrocarbon oil obtained with the method disclosed in the present invention has high stability, and the amount of the hydrogen gas dispersed and dissolved in the hydrocarbon oil is enough to meet the requirement of the hydropocessing.

(4) According to the method disclosed in the present invention, a hydroprocessing effect, which is comparable to or even better than that achieved by the prior art can be achieved with a lower hydrogen gas consumption even if neither diluent nor circulating product is employed.

Hereinafter, the present invention will be described in detail combining with examples and comparative examples.

In the following examples and comparative examples, the average pore diameter is measured with scanning electron microscopy, the distribution of the pore diameter is measured with mercury intrusion porosimetry, and the porosity is measured with nitrogen adsorption method.

In the following examples and comparative examples, the total sulfur content and the total nitrogen content in the diesel oil are measured by gas chromatography, and the cetane number of the diesel oil is measured with the method defined in GB 386-64.

In the following examples and comparative examples, the mercaptan sulfur content in the aviation kerosene is measured with the method defined in GB 1792-1988, and the total sulfur content in the aviation kerosene is measured with the method defined in GB/T 380-1977.

In the following examples and comparative examples, pressure is by gage pressure.

In experimental examples 1 to 5 and comparative experiment examples 1 to 2, the average gas holdup is measured with a volumetric expansion method disclosed by LIU Yan, et al., (Experimental Study on Gas Holdup in Bubble Refining Process, *Chinese Journal of Process Engineering*, Vol. 9 suppl. No. 1: p 97-101, June 2009), i.e., the average gas holdup is calculated according to the liquid level difference before and after inflate. Specifically, the testing method is as indicated below.

The test is carried out in an apparatus as shown in FIG. 5, wherein, the hydrogenation reactor 6 shown in FIG. 5 is replaced with a glass tube with a inner diameter of 34 mm and a length of 1,500 mm, and the liquid material outlet (with a inner diameter of 34 mm) of the mixing device is connected to the lower end of the glass tube via a flange (with a inner diameter of 34 mm).

During the test, hydrogen gas is mixed with hydrocarbon oil in mixing device 5, and then the resulted mixture is fed into the glass tube, and the liquid level (denoted as $H_2$) in the glass tube is measured; separately, hydrocarbon oil in the same amount without hydrogen gas is fed into glass tube, and the liquid level (denoted as $H_1$) in the glass tube is measured, and the average gas holdup is calculated with the expression as indicated below.

$$\text{Average gas holdup } (\%) = \frac{H_2 - H_1}{H_1} \times 100\%.$$

Experimental Example 1

In this experimental example, the mixing device 5 comprises a tube made of a porous material (purchased from Beijing Zhongtianyuan Environmental Engineering Co., Ltd., the outer diameter is 25.4 mm, the cross section of the tube is as shown in FIG. 4, the tube has 19 uniformly distributed liquid passages, the inner diameter of each liquid passage is 3.3 mm, the average pore diameter of the pores in the tube wall is 50 nm, the percentage of quantity of pores with a pore diameter in a range of 50 nm to 55 nm to the total quantity of the pores is 98%, the porosity is 20%) and a housing (with an inner diameter of 40 mm) to be used with the tube in combination, the space formed between the outer wall of the tube and the inner wall of the housing serves as gas passage.

Figure 9:
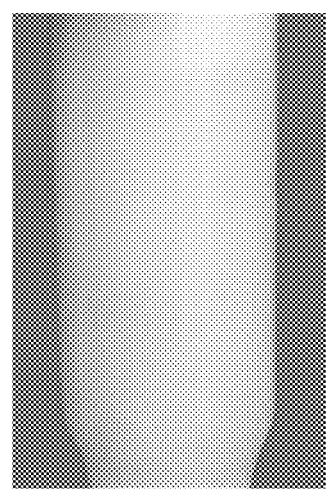
FIG. 9 is a photo of hydrogen-containing aviation kerosene in stable state (i.e., in stable time) obtained in experimental example 1.

Hydrogen gas is injected into aviation kerosene under the condition as shown in table 1, and the average gas holdup is measured, the result is shown in table 1, wherein, the hydrostatic column formed by aviation kerosene without hydrogen gas in the glass tube has a height of 200 mm. After the hydrogen-containing aviation kerosene is fed into the glass tube, the time required for the average gas holdup in the hydrogen-containing aviation kerosene in the glass tube to drop to 50% is measured, and thereby the stable time of the hydrogen-containing aviation kerosene is determined as shown in table 1. FIG. 9 shows a photo of hydrogen-containing aviation kerosene in stable state (i.e., in stable time).

Comparative Experimental Example 1

Figure 10:
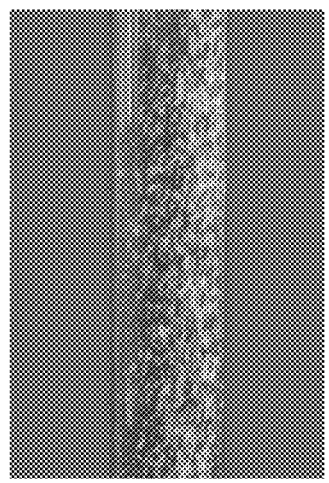
FIG. 10 is a photo of hydrogen-containing aviation kerosene in stable state obtained in comparative experimental example 1.

Hydrogen gas is injected with the same method as described in experimental example 1, but the difference is in that in the mixing device, the average pore diameter of the through-holes in the tube wall of the tube made of a porous material in the mixing device is 5 μm. The obtained average gas holdup and the stability of the hydrogen-carrying aviation kerosene are shown in table 1. FIG. 10 shows a photo of hydrogen-carrying aviation kerosene in stable state (i.e., in stable time).

Comparative Experimental Example 2

Hydrogen gas is injected with the same method as described in experimental example 1, but the difference is in that in the mixing device, the tube made of a porous material is replaced with a barrier layer with a thickness of 250 mm, which is packed with Φ3 mm ceramic O-rings. The obtained average gas holdup and the stability of the hydrogen-carrying aviation kerosene are shown in table 1.

Experimental Example 2

Hydrogen gas is injected with the same method as described in experimental example 1, but the difference is in that hydrogen gas is injected into aviation kerosene under a different condition. The obtained average gas holdup and the stability of the hydrogen-containing aviation kerosene are shown in table 1.

TABLE 1

| Entry | Type of hydrocarbon oil | $v_1$ (g·h$^{-1}$·m$^{-2}$) | $v_1/v_2$ | Injected amount of hydrogen gas (g/100 g hydrocarbon oil) | Average gas holdup (%) | Stable time (s) |
|---|---|---|---|---|---|---|
| Experimental Example 1 | Aviation kerosene | 1560 | 0.01 | 0.04 | 27.5 | 150 |
| Comparative Experimental Example 1 | Aviation kerosene | 1560 | 0.01 | 0.04 | 5.0 | 35 |
| Comparative Experimental Example 2 | Aviation kerosene | 1560 | 0.01 | 0.04 | 0.85 | 5 |
| Experimental Example 2 | Aviation kerosene | 160 | 0.001 | 0.04 | 20 | 120 |

$v_1$: injection rate of hydrogen gas in g·h$^{-1}$·m$^{-2}$, $v_2$: flow rate of hydrocarbon oil in unit of kg·h$^{-1}$·m$^{-2}$.

As can be seen from table 1, when hydrogen gas is injected into hydrocarbon oil with the method disclosed in the present invention, the obtained hydrocarbon oil has higher hydrogen gas content. Furthermore, the obtained hydrogen-containing hydrocarbon oil shows higher stability, so as to provide enough hydrogen for the subsequent hydrogenation process.

As can be seen from FIG. 9, the hydrogen-containing hydrocarbon oil obtained by the method disclosed in the present invention is in an emulsion state when it is stable, which indicates that the hydrogen gas has been dissolved and dispersed homogeneously in the hydrocarbon oil. In contrast, as shown in FIG. 10, when hydrogen gas is injected into hydrocarbon oil via pores with an average pore diameter of 5 μm, the obtained hydrogen-containing hydrocarbon oil has a large amount of visible bubbles, which may burst easily and remains stable in a very short time in hydrocarbon oil.

Examples 1 to 9 are provided herein to illustrate the method of the present invention.

Example 1

As shown in FIG. 6, diesel at second atmospheric side stream used as raw oil is mixed with hydrogen gas in the first mixing device; then, the resulted hydrogen-containing raw oil is fed into the first tubular fixed-bed reactor (with a inner diameter of 28 mm, there is one catalyst bed with a ratio of height to diameter of the catalyst packing of 9), and contacts with the catalyst having a hydrogenation catalytic action under the condition shown in table 2. Hydrogen gas is injected into the product output from the first tubular fixed-bed reactor through the second mixing device, and then the resulted hydrogen-containing mixture is fed through a pipeline with a inner diameter of 28 mm into the second tubular fixed-bed reactor (with a inner diameter of 28 mm, there is one catalyst bed with a ratio of height to diameter of the catalyst packing of 9), and contacts with the catalyst having a hydrogenation catalytic action under the condition shown in table 2. The test successively runs for 1,000 h. The properties of the raw oil and of the hydrogenated product output from the second tubular fixed-bed reactor are shown in table 2.

The temperature is 365° C. and the pressure is 4.5 MPa in the liquid passages of the mixing device. The injected amount of hydrogen gas in each mixing device is 0.18 parts by weight hydrogen gas in relation to 100 parts by weight raw oil (the chemical hydrogen consumption of 100 parts by weight raw oil is 0.27 parts by weight, the saturated solubility of hydrogen gas in the raw oil under the hydrorefining condition as shown in table 2 is 0.18% by weight). The injection rate of hydrogen gas is 62 g·h$^{-1}$·m$^{-2}$, and the ratio of the injection rate of hydrogen (by g·h$^{-1}$·m$^{-2}$) to the flow rate of the raw oil (by kg·h$^{-1}$·m$^{-2}$) is 0.03.

The catalyst having a hydrogenation catalytic action is catalyst FH-UDS from Sinopec Fushun Research Institute of Petroleum and Petrochemicals.

The mixing device comprises a tube made of a porous material (purchased from Beijing Zhongtianyuan Environmental Engineering Co., Ltd., the outer diameter is 25.4 mm, the cross section of the tube is as shown in FIG. 4, the tube has 19 uniformly distributed liquid passages, the inner diameter of each liquid passage is 3.3 mm, the average pore diameter of the pores in the tube wall is 50 nm, the percentage of the quantity of pores with a pore diameter in a range of 50 nm to 55 nm to the total quantity of pores is 98%, and the porosity is 20%) and a housing (with a inner diameter of 40 mm) to be used with the tube in combination, the space formed between the outer wall of the tube and the inner wall of the housing serves as a gas passage. The inner diameter of the outlet for outputting hydrogen-containing hydrocarbon oil on the mixing device is 28 mm.

Comparative Example 1

The hydroprocessing is carried out with the same method as described in Example 1, but the difference is in that the mixing device 5 is not used; instead, the hydrogen mixing device is replaced by a barrier layer (with a thickness of 250 mm) formed by Φ3 mm ceramic O-rings. Hydrogen gas is injected into a mixture of fresh raw oil and circulating product through the barrier layer (in relation to 100 parts by weight fresh raw oil, the amount of the circulating product is 200 parts by weight, and the injected amount of the hydrogen gas is 0.54 parts by weight); then, the obtained mixture is injected into the hydrogenation reactor for hydroprocessing. The hydroprocessing condition and the properties of the obtained hydrogenated product are shown in table 2.

Comparative Example 2

The hydroprocessing is carried out with the same method as described in comparative example 1, but the difference is in that in relation to 100 parts by weight fresh raw oil, the injected amount of the hydrogen gas is 0.18 parts by weight.

The properties of the obtained hydrogenated product are shown in table 2.

Comparative Example 3

The hydroprocessing is carried out with the same method as described in Example 1, but the difference is in that the average pore diameter of the pores in the tube wall of the tube made of a porous material in the mixing device is 5 μm, the porosity is 35%, and the percentage of the quantity of pores with a pore diameter in a range of 5 μm to 5.5 μm to the total quantity of pores is 95% (the tube is from Beijing Zhongtianyuan Environmental Engineering Co., Ltd.). The properties of the obtained hydrogenated product are shown in table 2.

nm to the total quantity of pores is 95%, and the porosity is 25%) and a housing (with a inner diameter of 40 mm) to be used with the tube in combination. The porous membrane is disposed on the outer wall of the membrane tube; the cross section of the membrane tube is as shown in FIG. 4. The membrane tube has 7 uniformly distributed liquid passages, and the inner diameter of each liquid passage is 6 mm. The space formed between the outer wall of the membrane tube and the inner wall of the housing serves as a gas passage.

The temperature is 365° C. and the pressure is 5.5 MPa in the liquid passages of the mixing device. The injected amount of hydrogen gas is 0.20 parts by weigh in relation to 100 parts by weigh raw diesel oil (the chemical hydrogen consumption of 100 parts by weigh raw diesel oil is 0.36 parts by weigh, the saturated solubility of hydrogen gas in the raw diesel oil under the hydrorefining condition shown in table 3 is 0.18% by weight). The hydroprocessing is

TABLE 2

| Hydroprocessing condition | | Reaction pressure/MPa<br>Reaction temperature/° C.<br>Volume hourly space velocity<br>of hydrocarbon oil/h$^{-1}$ | | 4.5<br>365<br>2.0 | |
| --- | --- | --- | --- | --- | --- |
| | | Raw oil | Example 1 | Comparative example 1 | Comparative example 2 | Comparative example 3 |
| Properties of hydrocarbon oil | Density (20° C.)/ g · cm$^{-3}$ | 0.8444 | 0.8321 | 0.8389 | 0.8429 | 0.8403 |
| | Distillation range (IBP/EBP)/° C. | 200/320 | 199/319 | 204/320 | 203/320 | 202/320 |
| | Sulfur content/ ug · g$^{-1}$ | 2650 | 45 | 49 | 524 | 175 |
| | Nitrogen content/ ug · g$^{-1}$ | 466 | 13 | 14 | 229 | 63 |
| | Cetane number | 50 | 54.1 | 54.1 | 51.3 | 53.0 |

As can be seen from table 2, the product obtained by the process according to the present invention not only has a high cetane number, but also has a lower sulfur and nitrogen contents.

Although the hydrogenation effect achieved by comparative example 1 is comparable to that achieved by example 1, 200 parts by weight circulating product are needed for every 100 parts by weight raw oil in comparative example 1; that is, for the same scale of apparatus, the throughput capacity of the apparatus in unit time achieved by comparative example 1 is only ⅓ of that achieved by Example 1. Furthermore, in comparative example 1, in relation to 100 parts by weight raw oil, the injected amount of hydrogen gas is 0.54 parts by weight, which is 3 times of that in the Example 1. Therefore, in comparative example 1, a hydrogenation effect comparable to that in Example 1 can be obtained only at a lower throughput capacity and a higher hydrogen consumption.

Example 2

The hydrocarbon oil is hydroprocessed with the same method as described in Example 1, but the difference is as indicated below.

The mixing device comprises a membrane tube (purchased from Beijing Zhongtianyuan Environmental Engineering Co., Ltd., the outer diameter is 25.4 mm, the average pore diameter of the through-holes in the substrate is 100 μm, the average pore diameter of the through-holes in the porous membrane is 250 nm, the percentage of the quantity of pores with a pore diameter in a range of 250 nm to 260 carried out under the condition as shown in FIG. 3. The injection rate of hydrogen gas is 123 g·h$^{-1}$·m$^{-2}$, and the ratio of the injection rate of hydrogen gas (by g·h$^{-1}$·m$^{-2}$) to the flow rate of raw diesel oil (by kg·h$^{-1}$·m$^{-2}$) is 0.048.

The properties of the raw diesel oil and of the obtained hydrogenated product are shown in table 3.

TABLE 3

| Hydroprocessing condition | | Reaction pressure/MPa<br>Reaction temperature/° C.<br>Volume hourly space velocity<br>of hydrocarbon oil/h$^{-1}$ | 5.5<br>365<br>3.0 |
| --- | --- | --- | --- |
| | | Raw oil | Example 2 |
| Properties of hydrocarbon oil | Density (20° C.)/g · cm$^{-3}$ | 0.8444 | 0.8339 |
| | Distillation range (IBP/EBP)/° C. | 200/320 | 200/319 |
| | Sulfur content/ug · g$^{-1}$ | 2650 | 40 |
| | Nitrogen content/ug · g$^{-1}$ | 466 | 6.0 |
| | Cetane number | 50 | 54.0 |

Example 3

The hydrocarbon oil is hydroprocessed with the same method as described in Example 1, but the difference is as indicated below.

The mixing device comprises a membrane tube (purchased from Beijing Zhongtianyuan Environmental Engineering Co., Ltd., the outer diameter is 25.4 mm, the average pore diameter of the through-holes in the substrate is 100 μm, the average pore diameter of the through-holes in the porous membrane is 500 nm, the percentage of the quantity of pores with a pore diameter in a range of 500 nm to 550 nm to the total quantity of pores is 95%, and the porosity is 25%) and a housing (with a inner diameter of 40 mm) to be used with the tube in combination. The porous membrane is disposed on the inner wall of the membrane tube; and the cross section of the tube is as shown in FIG. 4. The membrane tube has 19 uniformly distributed liquid passages, and the inner diameter of each liquid passage is 3.3 mm. The space formed between the outer wall of the membrane tube and the inner wall of the housing serves as a gas passage.

The temperature is 355° C. and the pressure is 8.0 MPa in the liquid passages of the mixing device. The injected amount of hydrogen gas is 0.25 parts by weigh in relation to 100 parts by weigh raw oil (the chemical hydrogen consumption of 100 parts by weigh raw oil is 0.36 parts by weigh, the saturated solubility of hydrogen gas in the raw oil under the hydrorefining condition shown in table 4 is 0.18% by weight). The injection rate of hydrogen gas is 120 $g \cdot h^{-1} \cdot m^{-2}$, and the ratio of the injection rate of hydrogen gas (by $g \cdot h^{-1} \cdot m^{-2}$) to the flow rate of raw oil (by $kg \cdot h^{-1} \cdot m^{-2}$) is 0.033.

The catalyst having a hydrogenation catalytic action is catalyst RS-1000 from Sinopec Research Institute of Petroleum Processing.

The hydroprocessing is carried out under the condition shown in table 4.

The properties of the raw diesel oil and of the obtained hydrogenated product are shown in table 4.

TABLE 4

| Hydroprocessing condition | Reaction pressure/MPa | | 8.0 |
| --- | --- | --- | --- |
| | Reaction temperature/° C. | | 355 |
| | Volume hourly space velocity of hydrocarbon oil/$h^{-1}$ | | 3.5 |

| | | Raw diesel oil | Example 3 |
| --- | --- | --- | --- |
| Properties of hydrocarbon oil | Density (20° C.)/g · $cm^{-3}$ | 0.8444 | 0.8340 |
| | Distillation range (IBP/EBP)/° C. | 200/320 | 204/320 |
| | Sulfur content/ug · $g^{-1}$ | 2650 | 9 |
| | Nitrogen content/ug · $g^{-1}$ | 466 | 8 |
| | Cetane number | 50 | 55 |

Example 4

As shown in FIG. 5, hydrogen gas is injected into aviation kerosene as raw oil by means of a mixing device, the hydrogen-containing aviation kerosene is fed through a pipeline with an inner diameter of 40 mm into a tubular fixed-bed reactor (with an inner diameter of 65 mm, there is one catalyst bed with a ratio of height to diameter of catalyst packing of 25), and contacts with a catalyst having a hydrogenation catalytic action (Catalyst RSS-2 from Sinopec Fushun Research Institute of Petroleum and Petrochemicals) under the condition shown in table 5.

The properties of the aviation kerosene as raw material and of the obtained hydrogenated product are shown in table 5.

The temperature is 260° C. and the pressure is 2.0 MPa in the liquid passages of the mixing device. The injected amount of hydrogen gas is 0.025 parts by weigh in relation to 100 parts by weigh raw oil (the chemical hydrogen consumption of 100 parts by weigh raw oil is 0.02 parts by weigh, the saturated solubility of hydrogen gas in the raw oil under the hydrorefining condition shown in table 5 is 0.05% by weight). The injection rate of hydrogen gas is 614 $g \cdot h^{-1} \cdot m^{-2}$, and the ratio of the injection rate of hydrogen gas (by $g \cdot h^{-1} \cdot m^{-2}$) to the flow rate of raw oil (by $kg \cdot h^{-1} \cdot m^{-2}$) is 0.004.

The mixing device comprises a tube made of a porous material (purchased from Beijing Zhongtianyuan Environmental Engineering Co., Ltd., the outer diameter is 25.4 mm, the cross section of the tube is shown as FIG. 4, the tube has 19 uniformly distributed liquid passages, the inner diameter of each liquid passage is 3.3 mm, the average pore diameter of the pores in the tube wall is 50 nm, the percentage of the quantity of pores with a pore diameter in a range of 50 nm to 55 nm to the total quantity of pores is 95%, and the porosity is 20%) and a housing (with a inner diameter of 40 mm) to be used with the tube in combination, the space formed between the outer wall of the tube and the inner wall of the housing serves as a gas passage. The inner diameter of the outlet for outputting hydrogen-containing hydrocarbon oil on the mixing device is 40 mm.

Comparative Example 4

The aviation kerosene is hydrorefined with the same method as described in Example 4, but the difference is in that the mixing device 5 is not used; instead, a barrier layer with a thickness of 250 mm, which is formed by packing Φ3 mm ceramic O-rings, is used as a mixing device, and hydrogen gas is injected into a mixture of fresh aviation kerosene and circulating aviation kerosene (in relation to 100 parts by weigh fresh aviation kerosene, the amount of circulating aviation kerosene is 200 parts by weigh, and the injected amount of hydrogen gas is 0.075 parts by weigh); then, the obtained hydrogen-containing mixture is separated in a gas liquid separator to remove excessive gas followed by feeding into the hydrogenation reactor for hydrorefining. The properties of the obtained hydrogenated product are shown in table 5.

Comparative Example 5

The aviation kerosene is hydrorefined with the same method as described in comparative example 4, but the difference is in that in relation to 100 parts by weigh fresh aviation kerosene, the injected amount of hydrogen gas is 0.025 parts by weigh. The properties of the obtained hydrogenated product are shown in table 5.

Comparative Example 6

The aviation kerosene is hydrorefined with the same method as described in Example 4, but the difference is in that the average pore diameter of the through-holes in the tube wall of the tube made of a porous material in the mixing device is 5 μm, the porosity is 35%, and the percentage of the quantity of pores with a pore diameter in a range of 5 μm to 5.5 μm to the total quantity of pores is 95% (the tube is from Beijing Zhongtianyuan Environmental Engineering Co., Ltd.). The properties of the obtained hydrogenated product are shown in table 5.

TABLE 5

| Hydrorefining condition | | Reaction pressure/MPa | | | 2.0 | |
|---|---|---|---|---|---|---|
| | | Reaction temperature/° C. | | | 260 | |
| | | Volume hourly space velocity of aviation kerosene/h$^{-1}$ | | | 6.0 | |

| | | Raw oil | Example 4 | Comparative example 4 | Comparative example 5 | Comparative example 6 |
|---|---|---|---|---|---|---|
| Properties of aviation kerosene | Density (20° C.)/ g · cm$^{-3}$ | 0.8063 | 0.8061 | 0.8046 | 0.8059 | 0.8058 |
| | Total sulfur content/ug · g$^{-1}$ | 953 | 97 | 54 | 297 | 251 |
| | Mercaptan sulfur content/ug · g$^{-1}$ | 113 | 2 | 6 | 23 | 11 |

As can be seen from table 5, the product obtained by the method according to the present invention has lower mercaptan sulfur content and high total sulfur content.

Furthermore, in the comparative example 4, 200 parts by weigh circulating product should be needed for every 100 parts by weigh raw oil. That is, at the same scale of apparatus, the throughout capacity of the apparatus in unit time is only ⅓ of that in the Example 4. In comparative example 4, in relation to 100 parts by weigh raw oil, the injected amount of hydrogen gas is 0.075 parts by weigh, which is 3 times of that in the Example 4. Therefore, the hydrogen consumption is high and the throughout capacity is low in the comparative example 4.

Example 5

The aviation kerosene is hydrorefined with the same method as described in Example 4, but the difference is as indicated below.

The mixing device comprises a membrane tube (purchased from Beijing Zhongtianyuan Environmental Engineering Co., Ltd., the outer diameter is 25.4 mm, the average pore diameter of the through-holes in the substrate is 100 μm, the average pore diameter of the through-holes in the porous membrane is 250 nm, the percentage of the quantity of pores with a pore diameter in a range of 250 nm to 260 nm to the total quantity of pores is 95%, and the porosity is 25%) and a housing (with a inner diameter of 40 mm) to be used with the tube in combination. The porous membrane is disposed on the outer wall of the membrane tube; the cross section of the membrane tube is as shown in FIG. 4. The membrane tube has 7 uniformly distributed liquid passages, and the inner diameter of each liquid passage is 6 mm. The space formed between the outer wall of the membrane tube and the inner wall of the housing serves as a gas passage.

The temperature is 260° C. and the pressure is 2.0 MPa in the liquid passages of the mixing device. The injected amount of hydrogen gas is 0.04 parts by weigh hydrogen gas in relation to 100 parts by weigh raw oil (the chemical hydrogen consumption of 100 parts by weigh raw oil is 0.02 parts by weigh, the saturated solubility of hydrogen gas in the raw oil under the hydrorefining condition shown in table 6 is 0.05% by weight). The injection rate of hydrogen gas is 1560 g·h$^{-1}$·m$^{-2}$, and the ratio of the injection rate of hydrogen gas (by g·h$^{-1}$·m$^{-2}$) to the flow rate of raw oil (by kg·h$^{-1}$·m$^{-2}$) is 0.01.

The hydrorefining is carried out under the condition shown in table 6.

The properties of the raw material and of the obtained hydrogenated product are shown in table 6.

TABLE 6

| Hydrorefining condition | | Reaction pressure/MPa | 2.0 |
|---|---|---|---|
| | | Reaction temperature/° C. | 260 |
| | | Volume hourly space velocity of aviation kerosene/h$^{-1}$ | 8.0 |

| | | Raw oil | Example 5 |
|---|---|---|---|
| Properties of aviation kerosene | Density (20° C.)/g · cm$^{-3}$ | 0.8027 | 0.8026 |
| | Total sulfur content/ug · g$^{-1}$ | 841 | 108 |
| | Mercaptan sulfur content/ug · g$^{-1}$ | 108 | 9 |

Example 6

The aviation kerosene is hydrorefined with the same method as that described in Example 4, but the difference is as indicated below.

The mixing device comprises a membrane tube (purchased from Beijing Zhongtianyuan Environmental Engineering Co., Ltd., the outer diameter is 25.4 mm, the average pore diameter of the through-holes in the substrate is 100 μm, the average pore diameter of the through-holes in the porous membrane is 500 nm, the percentage of the quantity of pores with a pore diameter in a range of 500 nm to 550 nm to the total quantity of pores is 95%, and the porosity is 25%) and a housing (with a inner diameter of 40 mm) to be used with the tube in combination. The porous membrane is disposed on the inner wall of the membrane tube; and the cross section of the tube is as shown in FIG. 4. The membrane tube has 19 uniformly distributed liquid passages, and the inner diameter of each liquid passage is 3.3 mm. The space formed between the outer wall of the membrane tube and the inner wall of the housing serves as a gas passage.

The temperature is 280° C. and the pressure is 4 MPa in the liquid passages of the mixing device. The injected amount of hydrogen gas is 0.05 parts by weigh in relation to 100 parts by weigh raw oil (the chemical hydrogen consumption of 100 parts by weigh raw oil is 0.05 parts by weigh, the saturated solubility of hydrogen gas in the raw oil under the hydrorefining condition shown in table 7 is 0.05% by weight). The injection rate of hydrogen gas is 1,960 g·h$^{-1}$·m$^{-2}$, and the ratio of the injection rate of hydrogen gas (by g·h$^{-1}$·m$^{-2}$) to the flow rate of raw oil (by kg·h$^{-1}$·m$^{-2}$) is 0.007.

The catalyst is catalyst FH-UDS from Sinopec Fushun Research Institute of Petroleum and Petrochemicals.

The hydrorefining is carried out under the condition as shown in table 7.

The properties of the obtained hydrogenated product are shown in table 7.

TABLE 7

| Hydrorefining condition | Reaction pressure/MPa | 4.0 |
| --- | --- | --- |
| | Reaction temperature/° C. | 280 |
| | Volume hourly space velocity of aviation kerosene/h⁻¹ | 12.0 |

| | | Raw oil | Example 6 |
| --- | --- | --- | --- |
| Properties of aviation kerosene | Density (20° C.)/g · cm⁻³ | 0.8056 | 0.8034 |
| | Total sulfur content/ug · g⁻¹ | 865 | 24 |
| | Sulfur content/ug · g⁻¹ | 75 | 1 |

Example 7

(1) As shown in FIG. 5, a catalytic reforming mixture output from a reforming reactor is injected into a gas liquid separating tank of reforming product for gas liquid separation, and a reformate is obtained from the bottom of the gas liquid separating tank. Wherein, the temperature is 40° C. and the pressure is 0.7 MPa in the gas liquid separating tank. Based on the total weight of obtained reformate, the reformate contains dissolved hydrogen in an amount of 0.01% by weight.

(2) Additional hydrogen gas is injected by means of a mixing device to the reformate as raw oil (the chemical hydrogen consumption of 100 parts by weigh raw oil is 0.03 parts by weigh, and, under the hydrorefining condition as shown in table 8, the saturated solubility of hydrogen gas in the raw oil is 0.025% by weight). The injection rate of hydrogen gas is 2435 g·h⁻¹·m⁻², and the ratio of the injection rate of hydrogen gas (by g·h⁻¹·m⁻²) to the flow rate of raw oil (by kg·h⁻¹·m⁻²) is 0.006. The hydrogen-containing reformate is fed through a tube with an inner diameter of 40 mm into a tubular fixed-bed reactor (with an inner diameter of 65 mm, and a ratio of length to diameter of 30. There is one catalyst bed with a ratio of height to diameter of 25 in the tubular fixed-bed reactor), and contacts with a catalyst having a hydrogenation catalytic action under the condition as shown in table 8. The aromatic content and bromine index of the obtained hydrogenated product are shown in table 9.

The mixing device comprises a tube made of a porous material (purchased from Beijing Zhongtianyuan Environmental Engineering Co., Ltd., the outer diameter is 25.4 mm, the cross section of the tube is shown as FIG. 4, the tube has 19 uniformly distributed liquid passages, the inner diameter of each liquid passage is 3.3 mm, the average pore diameter of the pores in the tube wall is 50 nm, the percentage of the quantity of pores with a pore diameter in a range of 50 nm to 55 nm to the total quantity of pores is 95%, and the porosity is 20%) and a housing (with a inner diameter of 40 mm) to be used with the tube in combination. The space formed between the outer wall of the tube and the inner wall of the housing serves as a gas passage. The inner diameter of the outlet for outputting hydrogen-containing hydrocarbon oil on the mixing device is 40 mm.

The temperature is 160° C. and the pressure is 1.8 MPa in the liquid passages of the mixing device. The catalyst having a hydrogenation catalytic action is catalyst HDO-18 from Fushun Research Institute of Petroleum and Petrochemicals, Sinopec.

(3) The obtained hydrogenated product is injected into a light constituents removing tower to remove light constituents with a carbon number lower than 5 in the mixture resulted from the hydroprocessing, to obtain a light constituent-removed oil. Subsequently, the light constituent-removed oil exchanges heat with the reformate in a heat exchanger followed by injecting the reformate into a heavy constituent removing tower to remove heavy constituent with a carbon number higher than 8, to obtain a raw material for aromatics extraction at the tower top.

Example 8

Reformate is hydroprocessed with the same method as described in Example 7, but the difference is as indicated below.

In step (1), the temperature is 40° C. and the pressure is 0.3 MPa in the gas liquid separating tank. Based on the total weight of the obtained reformate, the reformate contains dissolved hydrogen in an amount of 0.01% by weight.

In the step (2), the mixing device comprises a membrane tube (purchased from Beijing Zhongtianyuan Environmental Engineering Co., Ltd., the outer diameter is 25.4 mm, the average pore diameter of the through-holes in the substrate is 100 µm, the average pore diameter of the through-holes in the porous membrane is 250 nm, the percentage of the quantity of pores with a pore diameter in a range of 250 nm to 260 nm to the total quantity of pores is 95%, and the porosity is 25%) and a housing (with a inner diameter of 40 mm) to be used with the tube in combination. The porous membrane is disposed on the outer wall of the membrane tube; the cross section of the membrane tube is as shown in FIG. 4. The membrane tube has 7 uniformly distributed liquid passages, and the inner diameter of each liquid passage is 6 mm. The space formed between the outer wall of the membrane tube and the inner wall of the housing serves as a gas passage.

The temperature is 150° C. and the pressure is 1.5 MPa in the liquid passages of the mixing device. The chemical hydrogen consumption of 100 parts by weigh raw oil is 0.03 parts by weigh, and the saturated solubility of hydrogen gas in the raw oil is 0.025% by weight under the hydrorefining condition as shown in table 8. The injection rate of hydrogen gas is 2,180 g·h⁻¹·m⁻², and the ratio of the injection rate of hydrogen gas (by g·h⁻¹·m⁻²) to the flow rate of raw oil (by kg·h⁻¹·m⁻²) is 0.007. The catalyst is catalyst HDO-18 from Sinopec Fushun Research Institute of Petroleum and Petrochemicals.

The aromatic content and bromine index of the obtained hydrogenated product are shown in table 9.

Example 9

Reformate is hydroprocessed with the same method as that described in Example 7, but the difference is as indicated below.

In the step (2), the mixing device comprises a membrane tube (purchased from Beijing Zhongtianyuan Environmental Engineering Co., Ltd., the outer diameter is 25.4 mm, the average pore diameter of the through-holes in the substrate is 100 µm, the average pore diameter of the through-holes in the porous membrane is 500 nm, the percentage of the quantity of pores with a pore diameter in a range of 500 nm to 550 nm to the total quantity of pores is 95%, and the porosity is 25%) and a housing (with a inner diameter of 40 mm) to be used with the tube in combination. The porous membrane is disposed on the inner wall of the membrane tube; the cross section of the membrane tube is as shown in FIG. 4. The membrane tube has 19 uniformly distributed liquid passages, and the inner diameter of each liquid passage is 3.3 mm. The space formed between the outer wall of the membrane tube and the inner wall of the housing serves as a gas passage.

The aromatic content and bromine index of the obtained hydrogenated product are shown in table 9.

Comparative Example 7

Reformate is hydroprocessed with the same method as described in Example 9, but the difference is in that in the mixing device, the average pore diameter of the through-holes in the tube wall of the tube made of a porous material is 5 μm, and the percentage of the quantity of pores with a pore diameter in a range of 5 μm to 5.5 μm to the total quantity of pores is 95%, and the porosity is 35% (the tubes are from Beijing Zhongtianyuan Environmental Engineering Co., Ltd.). The aromatic content and bromine index of the obtained hydrogenated product are shown in table 9.

TABLE 8

| | Process Condition | | | |
|---|---|---|---|---|
| | Example 7 | Example 8 | Example 9 | Comparative example 7 |
| Reaction pressure/MPa | 1.8 | 1.5 | 1.8 | 1.8 |
| Reaction temperature/° C. | 160 | 150 | 160 | 160 |
| Volume space velocity of reformate/h$^{-1}$ | 20 | 15 | 10 | 10 |
| Amount of additional hydrogen gas/wt % | 0.015 | 0.02 | 0.02 | 0.02 |

TABLE 9

| | Properties of hydrocarbon oil | | | | |
|---|---|---|---|---|---|
| | Raw oil | Example 7 | Example 8 | Example 9 | Comparative example 7 |
| Density (20° C.)/ g · cm$^{-3}$ | 0.799 | 0.799 | 0.799 | 0.801 | 0.803 |
| Aromatics content/wt % | 75.01 | 74.71 | 74.7 | 74.67 | 75.04 |
| Bromine index/ mgBr/100 g | 2300 | 3.5 | 33 | 46 | 112 |

As can be seen from the result shown in table 9, when reformate is hydrorefined by the method according to the present invention, there is substantially no loss of aromatics, and the bromine content in the obtained hydrorefined oil is low.

While some preferred Examples of the present invention are described above, the present invention is not limited to the details in those Examples. The person skilled in the art can make modifications and variations to the technical scheme of the present invention, without departing from the spirit of the present invention. However, all these modifications and variations shall be deemed as falling into the protected domain of the present invention.

Moreover, different embodiments of the present invention can be combined freely as required, as long as the combinations do not deviate from the ideal and spirit of the present invention. However, such combinations shall also be deemed as falling into the scope disclosed in the present invention.

The invention claimed is:

1. A method for hydroprocessing hydrocarbon oil, comprising:
feeding a first hydrocarbon oil feedstock into an inlet of a first mixing device having pores with an average pore diameter in a nanometer size range,
injecting hydrogen gas into the first hydrocarbon oil feedstock through the pores in the first mixing device to obtain a first hydrogen-containing hydrocarbon oil feedstock from an outlet of the first mixing device;
feeding the first hydrogen-containing hydrocarbon oil feedstock into an inlet of a first hydrogenation reactor to contact a first catalyst having a hydrogenation catalytic action disposed in the first hydrogenation reactor under a first liquid-phase hydroprocessing condition; and
obtaining a first product stream from an outlet of the first hydrogenation reactor;
feeding the first product stream into an inlet of a second mixing device having pores with an average pore diameter in a nanometer size range;
injecting hydrogen gas into the first product stream through the pores in the second mixing device to obtain a hydrogen-containing first product stream from an outlet of the second mixing device;
feeding the hydrogen-containing first product stream into an inlet of a second hydrogenation reactor to contact a second catalyst having a hydrogenation catalytic action disposed in the second hydrogenation reactor under a liquid-phase hydroprocessing condition; and
obtaining a second product stream from an outlet of the second hydrogenation reactor.

2. The method according to claim 1, wherein the pores have an average pore diameter in a range of 1 nm to 1,000 nm.

3. The method according to claim 2, wherein a percentage of the pores with a pore diameter in a range of 50 nm to 500 nm to a total number of the pores is 95% or higher.

4. The method according to claim 1, wherein the hydrogen gas is injected into the hydrocarbon oil in a flowing state at a rate of $v_1$ by g·h$^{-1}$·m$^{-2}$, the hydrocarbon oil has a flow rate of $v_2$ by kg·h$^{-1}$·m$^{-2}$, and a ratio of $v_1/v_2$ is in a range of 0.000625 to 0.09.

5. The method according to claim 1, wherein the first mixing device comprises at least one liquid passage for accommodating the first hydrocarbon oil and at least one gas passage for accommodating the hydrogen gas, the liquid passage is separated from the gas passage by a component having a porous area containing the pores.

6. The method according to claim 5, wherein the porous area has a porosity in a range of 5-28%.

7. The method according to claim 1, wherein the first hydrogenation reactor is a fixed-bed reactor, a volume space velocity of the first hydrocarbon oil is in a range of 0.5 h$^{-1}$ to 20 h$^{-1}$; the liquid-phase hydroprocessing condition comprises a temperature in a range of 120° C. to 500° C. and a pressure in a range of 1 MPa to 20 MPa by gage pressure.

8. The method according to claim 1, wherein the first hydrogenation reactor is a tubular reactor.

9. The method according to claim 7, wherein the tubular reactor has a ratio of length to inner diameter in a range of 5-50:1.

10. The method according to claim 9, wherein the tubular reactor has an inner diameter in a range of 20 nm to 1,000 mm.

11. The method according to claim 1, wherein the hydroprocessing of the first hydrocarbon oil feedstock is one or more selected from the group consisting of hydrodeolefin, hydrodesulfurization, hydrodenitrogenation, hydrodeoxygenation, and hydrodemetalization.

12. The method according to claim 1, wherein the first hydrocarbon oil feedstock is one or more selected from the group consisting of gasoline, reformate, aviation fuel, and diesel oil.

13. The method according to claim 12, wherein the hydrogen gas is injected in an amount for 0.1 to 4 times of a saturated solubility of the hydrogen gas in the first hydrocarbon oil feedstock, and the saturated solubility is measured under the liquid-phase hydroprocessing condition.

14. The method according to claim 1, further comprising contacting the first hydrogen-containing hydrocarbon oil feedstock with the first catalyst without the presence of a diluent or a circulating oil.

15. A method for hydroprocessing hydrocarbon oil, comprising:
    feeding a first hydrocarbon oil feedstock into an inlet of a first mixing device having pores with an average pore diameter in a nanometer size range,
    injecting hydrogen gas into the first hydrocarbon oil feedstock through the pores in the first mixing device to obtain a first hydrogen-containing hydrocarbon oil feedstock from an outlet of the first mixing device;
    feeding the first hydrogen-containing hydrocarbon oil feedstock into an inlet of the first hydrogenation reactor to contact a first catalyst having a hydrogenation catalytic action disposed in the first hydrogenation reactor under a first liquid-phase hydroprocessing condition;
    obtaining a first product stream from an outlet of the first hydrogenation reactor;
    injecting hydrogen gas into a second hydrocarbon oil feedstock through a second mixing device having pores with an average pore diameter in a nanometer size range to obtain a second hydrogen-containing hydrocarbon oil feedstock;
    feeding the second hydrogen-containing hydrocarbon oil feedstock into a second hydrogenation reactor to contact a second catalyst having a hydrogenation catalytic action disposed in the second hydrogenation reactor under a liquid-phase hydroprocessing condition;
    obtaining a second product stream; and
    combining the first product stream and the second product stream.

16. The method of claim 1, wherein the first catalyst and the second catalyst are the same.

17. The method of claim 15, wherein the wherein the first mixing device comprises at least one liquid passage for accommodating the first hydrocarbon oil and at least one gas passage for accommodating the hydrogen gas, the liquid passage is separated from the gas passage by a component having a porous area containing the pores.

18. The method of claim 15, wherein the hydroprocessing of the first hydrocarbon oil feedstock is one or more selected from the group consisting of hydrodeolefin, hydrodesulfurization, hydrodenitrogenation, hydrodeoxygenation, and hydrodemetalization.

19. The method of claim 15, wherein the first hydrocarbon oil feedstock is one or more selected from the group consisting of gasoline, reformate, aviation fuel, and diesel oil.

* * * * *